Oct. 12, 1926. 1,602,884
J. COULTER
MACHINE FOR THREADING WRENCH JAWS AND THE LIKE
Filed May 19, 1923   5 Sheets-Sheet 4
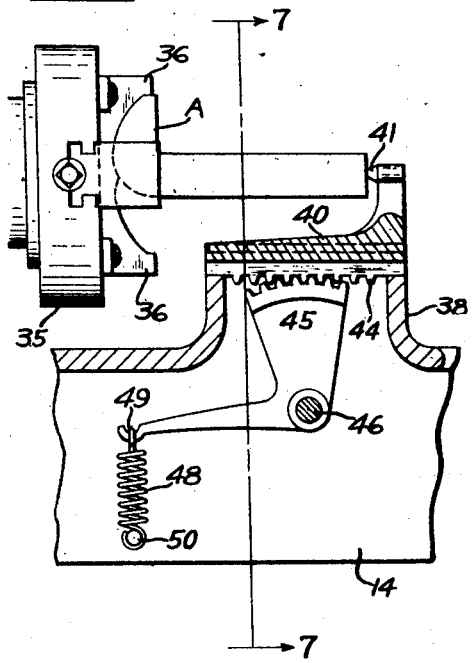
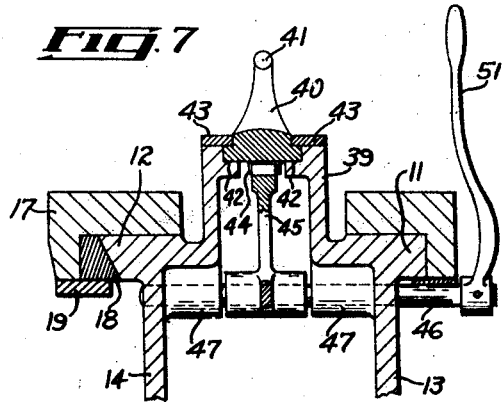
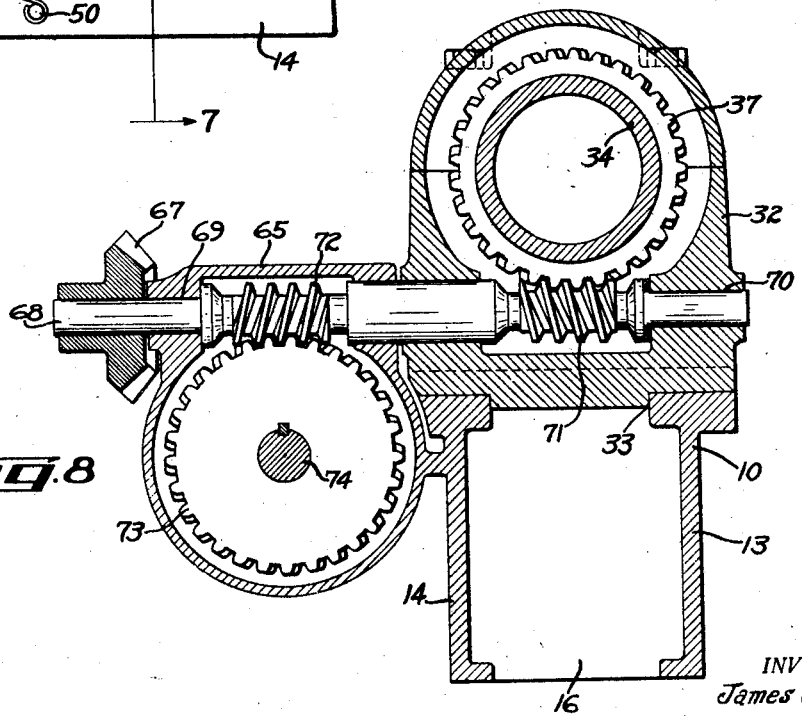
INVENTOR.
James Coulter.
BY G. H. Braddock
ATTORNEY.

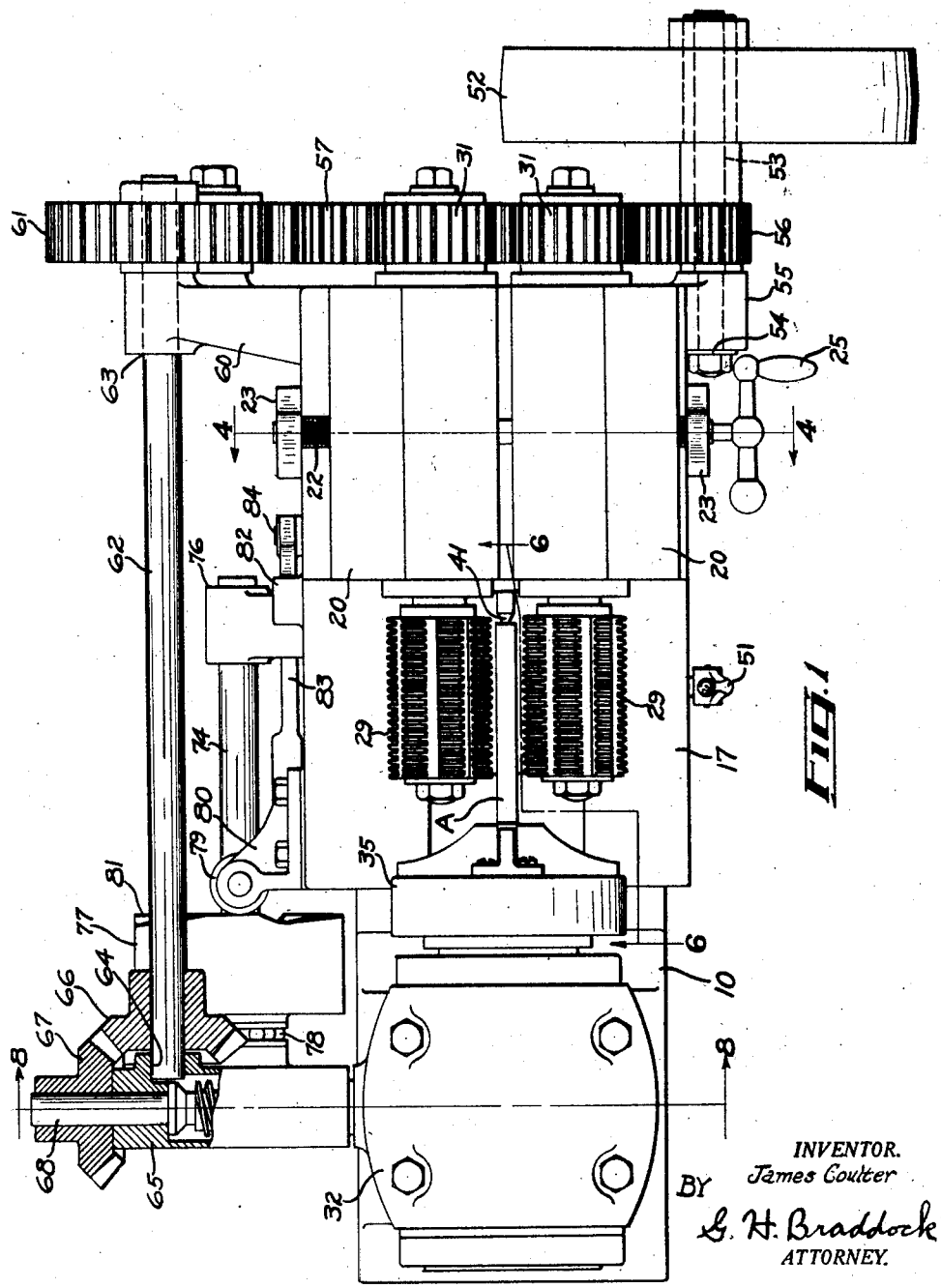

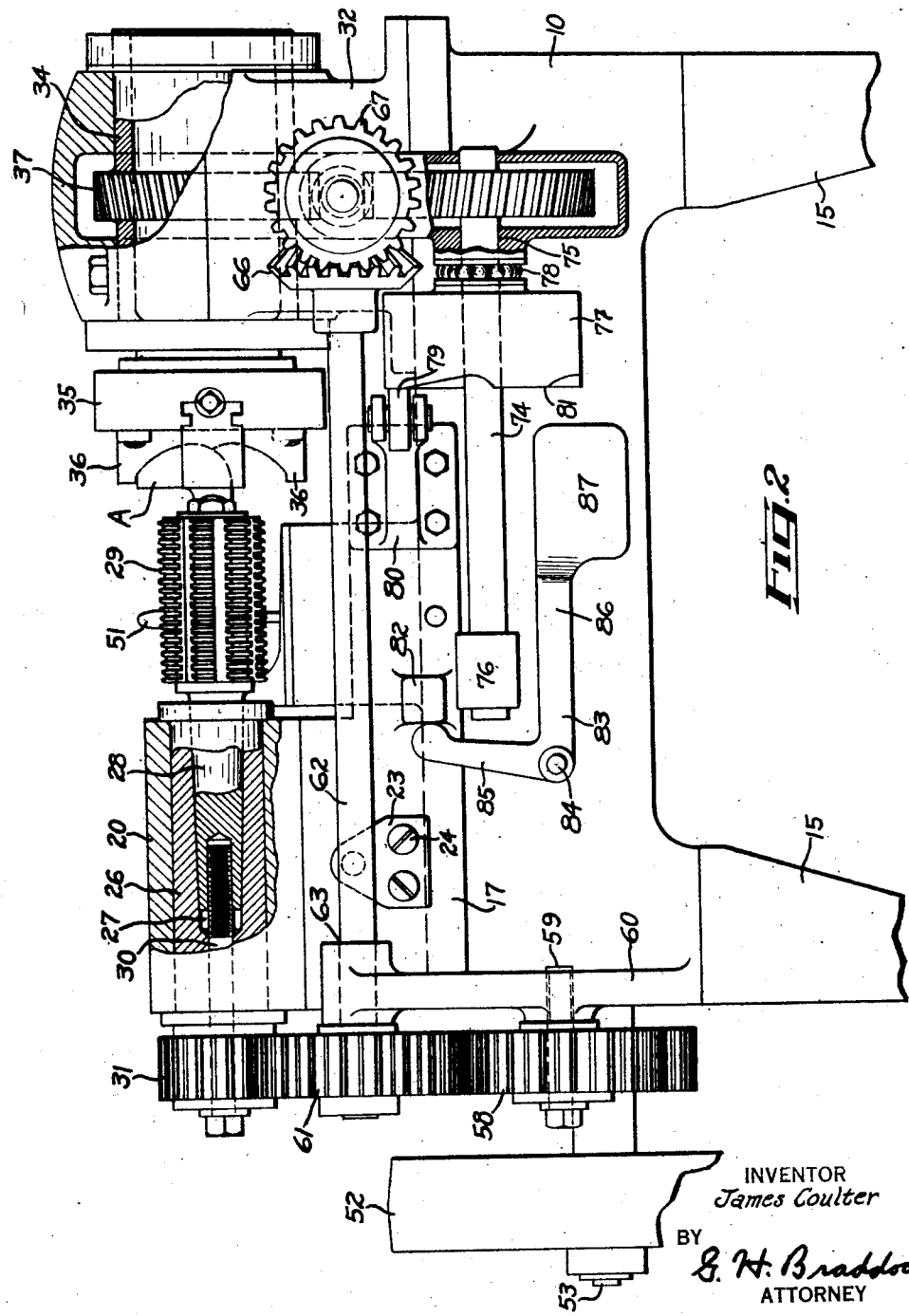

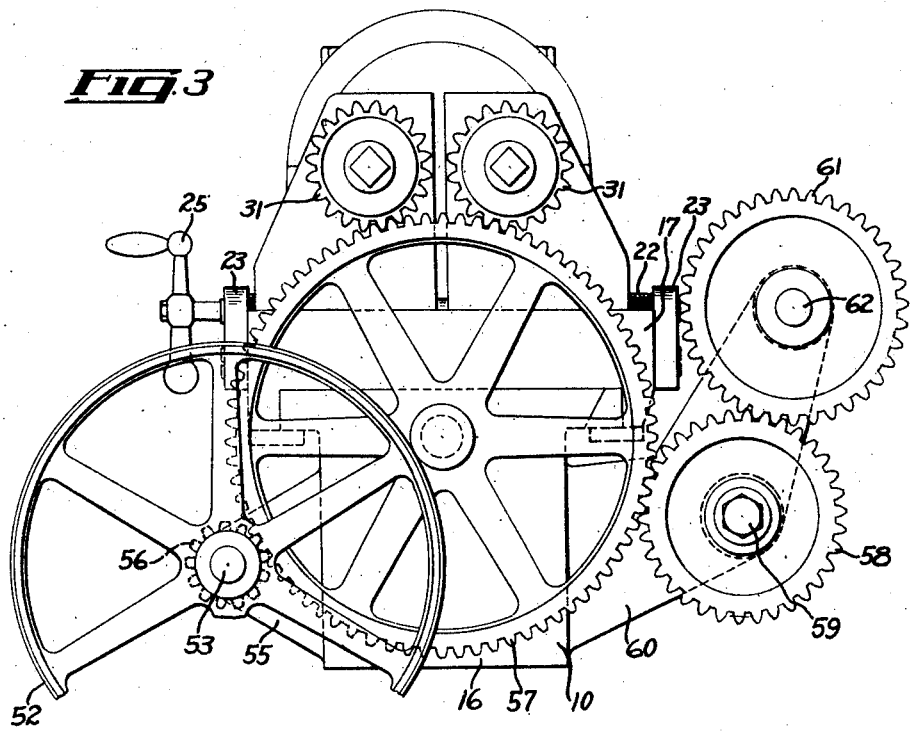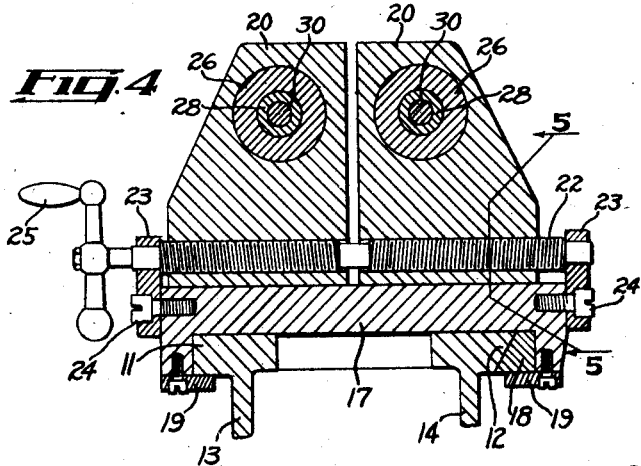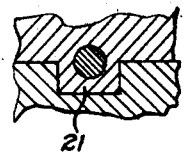

Oct. 12, 1926.
J. COULTER
1,602,884
MACHINE FOR THREADING WRENCH JAWS AND THE LIKE
Filed May 19, 1923    5 Sheets-Sheet 5
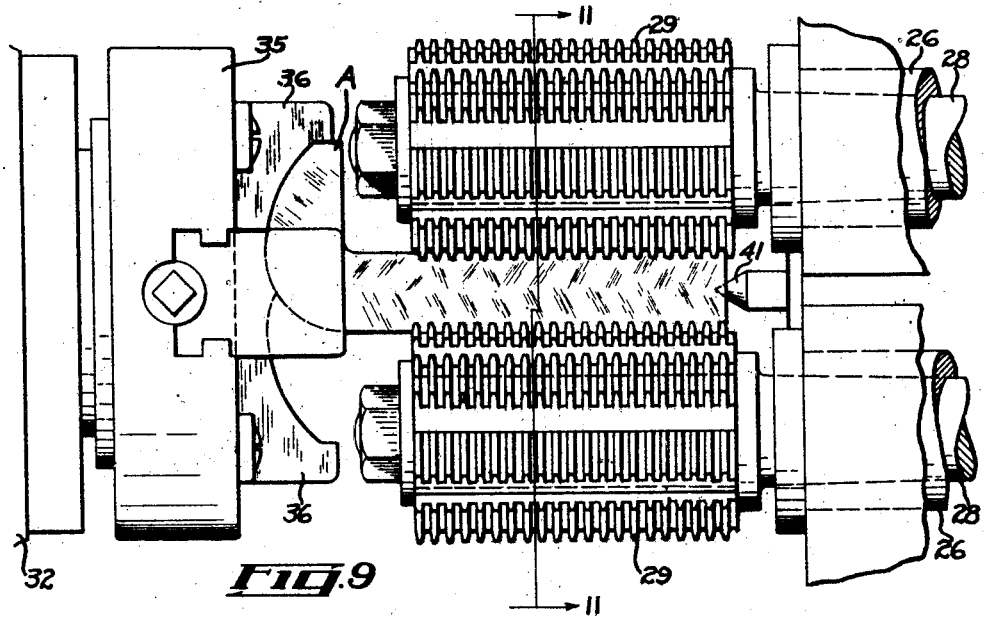
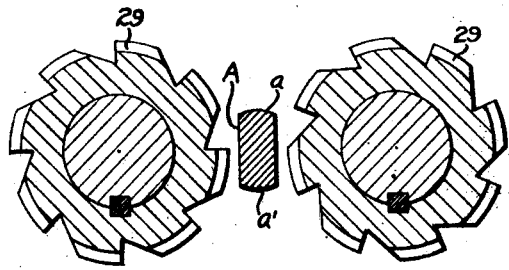
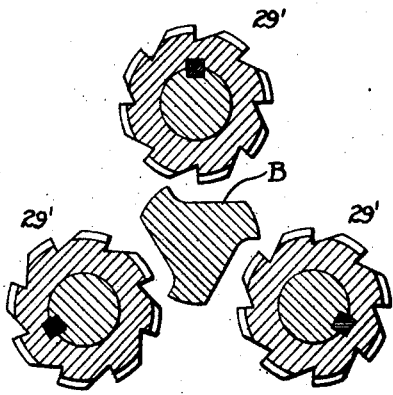
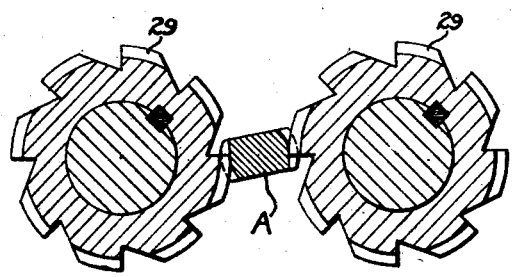
INVENTOR
*James Coulter*
BY
*G. H. Braddock*
ATTORNEY Patented Oct. 12, 1926.

1,602,884

UNITED STATES PATENT OFFICE.

JAMES COULTER, OF BRIDGEPORT, CONNECTICUT, ASSIGNOR TO AUTOMATIC MACHINE COMPANY, OF BRIDGEPORT, CONNECTICUT, A CORPORATION OF CONNECTICUT.

MACHINE FOR THREADING WRENCH JAWS AND THE LIKE.

Application filed May 19, 1923. Serial No. 640,099.

This invention relates to a machine for cutting threads, and has more especial reference to a machine having apparatus for simultaneously cutting threads upon a plurality of related faces of a device, such, for example, as a wrench jaw having a pair of surfaces requiring to be threaded which are disposed opposite each other, or a die or tap having two or more surfaces to be threaded arranged about the axis of the die or tap.

An object of the invention is to provide a machine having apparatus adapted to simultaneously thread related faces of a wrench jaw, die, tap, or other device.

A further object is to provide a machine of the present character which will be capable of completely threading oppositely disposed or otherwise related faces of a device requiring to be threaded during a single part revolution of the device.

And a further object is to provide in the machine novel and improved apparatus (1) for locating the device or stock to be threaded; (2) for rotating the device or stock-cutting means and the device or stock relatively to each other; and (3) for accomplishing relative longitudinal movement of the cutting-means and device or stock during the threading operation for the pitch of the thread.

With the above objects in view, as well as as others which will appear as the specification proceeds, the invention comprises the construction, arrangement and combination of parts as now to be fully described and as hereinafter to be specifically claimed, it being understood that the disclosure herein is merely illustrative of the principles of the invention and meant in no way in a limiting sense, changes in details of construction and arrangement of parts being permissible so long as within the scope of the appended claims.

In the accompanying drawings forming a part of this specification:—

Fig. 1 is a top plan view, partially in section, of a machine in which the features of the invention are incorporated;

Fig. 2 is an elevational view, partially in section, of the machine of Fig. 1;

Fig. 3 is an end view, parts being omitted, showing the machine drive;

Fig. 4 is a sectional view on line 4—4 in Fig. 1;

Fig. 5 is a sectional view on line 5—5 in Fig. 4;

Fig. 6 is a sectional view on line 6—6 in Fig. 1;

Fig. 7 is a sectional view on line 7—7 in Fig. 6;

Fig. 8 is a sectional view on line 8—8 in Fig. 1;

Fig. 9 is an enlarged plan view of the cutters and the device holding mechanism, showing a wrench jaw as when being threaded;

Figs. 10 and 11 are sectional views as on line 11—11 in Fig. 9, Fig. 10 disclosing the wrench jaw as when inserted to be threaded or as when ready to be removed after being cut, and Fig. 11 showing the wrench jaw as in Fig. 9; and Fig. 12 is a sectional view, illustrating a modified form of the invention, corresponding with the showing of Fig. 10, disclosing three cutters and a three-toothed tap as when positioned to be threaded or removed.

With respect to the drawings and the numerals of reference indicated thereon, 10 denotes the frame of the machine as an entirety, including spaced apart ways 11 and 12, extending longitudinally of the frame, having webs 13 and 14 supported in any manner as by legs 15. 16 is a web at one end of the frame extending downwardly from the ways 11 and 12 and between the webs 13 and 14, also supported upon the legs 15.

17 is a carrier slide arranged in any suitable manner on the ways 11 and 12 adjacent the web 16 to have reciprocatory movement on said ways longitudinally thereof, 18 representing a common form of gib engaging the way 12, and 19 representing caps secured to portions of the carrier slide and engaging the lower faces of the way 11 and gib 18, respectively, for holding the carrier slide to the ways as will be understood.

20 are cutter spindle bearings upon the slide 17 adapted to movement transversely of the frame toward and from each other but to have no longitudinal movement on the carrier slide, 21 denoting a tongue and groove engagement between each cutter spindle bearing and said slide 17, and 22 is an adjusting screw, extending transversely through the spindle bearings, with right and left threads for adjusting said bearings 20. As shown, the opposite end portions of the adjusting screw 22 are mounted in small plates 23 secured to the opposite sides of the carrier slide as at 24, and one end portion of said adjusting screw has a manipulating handle 25. Clearly, turning the handle 25 in proper direction moves the spindle bearings toward or from each other as may be intended.

26 are parallel, preferably horizontally disposed cutter spindles mounted in the bearings 20 in any suitable manner and arranged longitudinally of the frame. As disclosed, each cutter spindle has a taper hole 27 receiving a shank 28 of a cutter arbor having a cutter 29, said cutters also being parallel and horizontally disposed, and a draw bolt 30 is utilized to insure the position of each shank of a cutter arbor in a spindle 26. Small spur gears 31 upon the ends of the cutter spindles spaced from the cutters are for a purpose to be explained.

32 is a head stock housing fixed upon the ways 11 and 12 at the end of the frame opposite the web 16, as shown more clearly at 33 in Fig. 8, and 34 is a head stock chuck spindle mounted in said housing and having an ordinary two jawed lathe chuck 35 with nests 36. The chuck spindle 34 includes a worm wheel 37 for a purpose to be explained.

The frame is brought up as at 38 between the ways 11 and 12 and intermediate the cutter spindle bearings and head stock housing, to form a bed 39 for sliding tail stock 40 including a tail center 41. As shown more clearly in Figs. 6 and 7, the bed 39 includes a way 42 for the tail stock, and caps 43 hold the tail stock in the way. 44 is a rack on the lower face of the tail stock, 45 is a sector meshing with said rack and rigidly fixed to a rod 46 mounted in the frame as at 47, and 48 is a coil spring attached to an arm of the sector as at 49 and to the frame as at 50 to exert a spring tension upon the tail stock tending to move it toward the head stock. See Fig. 6. 51 is an operating lever upon the rod 46 and at one side of the frame for moving the tail stock away from the head stock, against the action of the coil spring, when an article to be threaded is being inserted in the machine.

52 is a driving pulley on a shaft 53 mounted as at 54 in a bracket 55 upon the web 13, and 56 is a pinion fixed to said shaft 53 and meshing with a large gear 57 on a stud mounted in the web 16. The large gear 57 meshes with the small spur gears 31 upon the cutter spindles 26 as clearly disclosed in Fig. 3. The transverse adjustment of the cutter spindle bearings permits a proper engagement between the gear 57 and the small spur gears 31.

The large gear 57 also meshes with an idler gear 58 on a stud 59 in a bracket 60 on the web 14, the idler itself meshing with a spur gear 61 upon a shaft 62 having one of its ends mounted in the bracket 60 as at 63. The opposite end of the shaft 62 is mounted as at 64 in a worm wheel housing 65, and adjacent said opposite end, said shaft 62 has a bevel gear 66 meshing with a bevel gear 67 on a shaft 68, at right-angles to the shaft 62 mounted in said worm wheel housing as at 69 and in the head stock housing 32 before mentioned as at 70.

The shaft 68 includes a worm 71 which meshes with the worm wheel 37 of the chuck spindle, and also includes a worm 72 meshing with a worm wheel 73 within the housing 65 and fixed on a shaft 74, preferably parallel with the shaft 62, having one of its ends mounted in the worm wheel housing as at 75, and its other end mounted in a bracket 76 upon the web 14. 77 is a cam rigidly secured to the shaft 74, and 78 is a ball thrust bearing between said cam and worm wheel housing.

79 denotes a roller secured upon the carrier slide 17 in any manner as denoted at 80 and adapted to engage the working face 81 of the cam 77.

82 is a lug upon the carrier slide, and 83 is a bell crank lever pivoted upon the frame as at 84 and having an arm 85 engaging the lug and an arm 86 with weight 87 adapted to hold the roller 79 against the working face of the cam. See Fig. 2.

The machine as fully described is best adapted to thread oppositely disposed surfaces of a wrench jaw or the like, denoted A in the drawings. In Fig. 10 I have disclosed the wrench jaw as when inserted to be threaded or as when ready to be removed after being cut. That is, the wrench jaw is midway between the cutters and the surfaces thereof to be threaded, denoted $a$ and $a'$, are disposed one above the other at the farthest distance possible from the cutters. When inserting the wrench jaw in the machine, the large end thereof may be placed in the chuck 35 to rest against a nest 36 while the tail center is held away from its normal position by means of the operating lever 51 in the manner described, the tail stock may then be released so that the tail center can engage the small end of the wrench jaw as in Figs. 1, 6 and 9, and the chuck may then be manipulated to clamp said large end.

The manner in which the machine operates is as follows. The driving pulley is rotated from some source of power supply by means of a belt (not shown), and power is transmitted through the pinion 56 to the large gear 57 which rotates the cutter spindles and cutters at a rapid rate of speed, both cutters rotating at the same rate and in the same direction.

The large gear 57 also rotates the idler 58 to turn the shaft 62 which transmits its power to the shaft 68 by reason of the engagement between the bevel gears 66 and 67. The worm 71 on the shaft 68, naturally, rotates the chuck spindle by reason of its engagement with the worm wheel 37, the chuck spindle having movement of rotation in the direction opposite that of the cutters and at a greatly reduced rate of speed.

The worm 72 on the shaft 68 rotates the shaft 74 by reason of the engagement of said worm with the worm wheel 73, and the cam 77 rotates with said shaft 74. As fully described, the weight 87 holds the roller 79 in engagement with the working face 81 of said cam 77, and said working face is of a configuration to cause the carrier slide to reciprocate on the ways 11 and 12.

The cutters 29 each include spaced apart, annularly positioned rows of teeth, the rows of one cutter being arranged in advance of the rows of the other cutter to correspond with the pitch of the thread to be cut, as will be understood.

When the bearings 20 have been adjusted to desired position and a wrench jaw A or other device to be threaded has been inserted in the machine as in Figs. 1, 6 and 9, power is applied to the driving pulley to rotate the parts of the machine in the manner explained. The opposite surfaces of the wrench jaw are not only fed to the cutting teeth of the cutter, both in the same manner as best disclosed in Figs. 9 and 11, but the cutters are caused to have longitudinal movement relatively to the wrench jaw an amount depending upon the configuration of the working face 81 of the cam and corresponding to the pitch of the thread to be placed upon said opposite surfaces. As shown, the working face 81 of said cam is constructed to move the carrier slide to and fro twice during a complete revolution of the wrench jaw; that is, to and fro once during each half revolution.

The tail stock and bed are located to offer no interference to the reciprocation of the carrier slide, and the gears 31 and 57 are relatively thick to insure their interengagement at all times.

In the construction as shown and described, all of the rows of cutting teeth of the cutters operate simultaneously on the wrench jaw surfaces. Consequently, said surfaces can be completely threaded during a single part revolution, one-half of a revolution as illustrated, of the wrench jaw. At the end of the threading operation the work can be removed and other work substituted. The machine can of course be stopped while removing and inserting work.

In Fig. 12 I have shown a modified form of the invention, wherein 29' represents three cutters for simultaneously threading a three-toothed tap B, the tap being shown as when positioned to be threaded or removed. Evidently, the principle is the same as when threading the opposite surfaces of the wrench jaw. The tap, as well as the wrench jaw, can be inserted in and removed from the machine in any suitable manner, as by utilization of the adjusting screw 22 or some equivalent element in a manner which will be understood. That is to say, the cutters may be moved apart when a threaded piece of work is to be removed and an unthreaded piece is to be inserted, and can then be adjusted relatively to said piece of work to perform their intended function, the adjusting screw 22 disclosing one manner of making this adjustment. Obviously, but one-third of a revolution of the tap of Fig. 12 is required for complete threading, and the cam or other element utilized for obtaining relative longitudinal reciprocation of cutters and work would be of modified form.

It is obvious that the arrangement of Fig. 12 can be reversed and used to cut internal threads within the spirit of the present invention.

Having thus fully described the invention, what I claim as new and desire to secure by Letters Patent is:—

1. In a machine of the character described, a plurality of spaced apart, parallel cutters, each including spaced apart, annular rows of cutting teeth adapted to simultaneously thread separate, related faces of a piece of work, means for rotating said cutters in the same direction, a device for holding said work in parallel relation to all of said cutters, means for rotating said work a part revolution in direction opposite that of rotation of said cutters while each cutter completes its threading operation upon a face of said piece of work, and mechanism for accomplishing relative longitudinal movement of said cutters and work to provide for the pitch of said thread.

2. The combination as specified in claim 1, wherein the rows of teeth of one cutter are arranged in advance of the rows of teeth of another cutter an amount to correspond with the pitch of thread to be cut.

3. In a machine for threading oppositely disposed surfaces of a wrench jaw, a pair of spaced apart, parallel cutters each having a plurality of cutting teeth arranged in spaced apart, annular rows about said cutters, means for rotating said cutters both in the same direction and at rapid rate of speed, a device for simultaneously presenting said oppositely disposed surfaces to said cutting teeth of the different cutters, means for rotating said wrench jaw a part revolution in direction opposite that of rotation of said cutters while each cutter completes its threading operation upon a surface of said wrench jaw, and means for accomplishing relative longitudinal movement of said cutters and wrench jaw during the threading operation to provide for the pitch of thread to be placed on said oppositely disposed surfaces.

4. In a machine of the character described, a plurality of spaced apart, parallel cutters each including spaced apart, annular rows of cutting teeth adapted to simultaneously thread separate, related faces of a piece of work, means for rotating said cutters in the same direction, a device for holding said work in parallel relation to all of said cutters, means for rotating said work in direction opposite that of rotation of said cutters and at reduced rate of speed, and mechanism for accomplishing relative longitudinal movement of said cutters and work to provide for the pitch of said thread.

5. The combination as specified in claim 4, wherein the rows of teeth of one cutter are arranged in advance of the rows of teeth of another cutter an amount to correspond with the pitch of thread to be cut.

Signed at Bridgeport, in the county of Fairfield, and State of Connecticut, this 15th day of May, A. D., 1923.

JAMES COULTER.